UNITED STATES PATENT OFFICE.

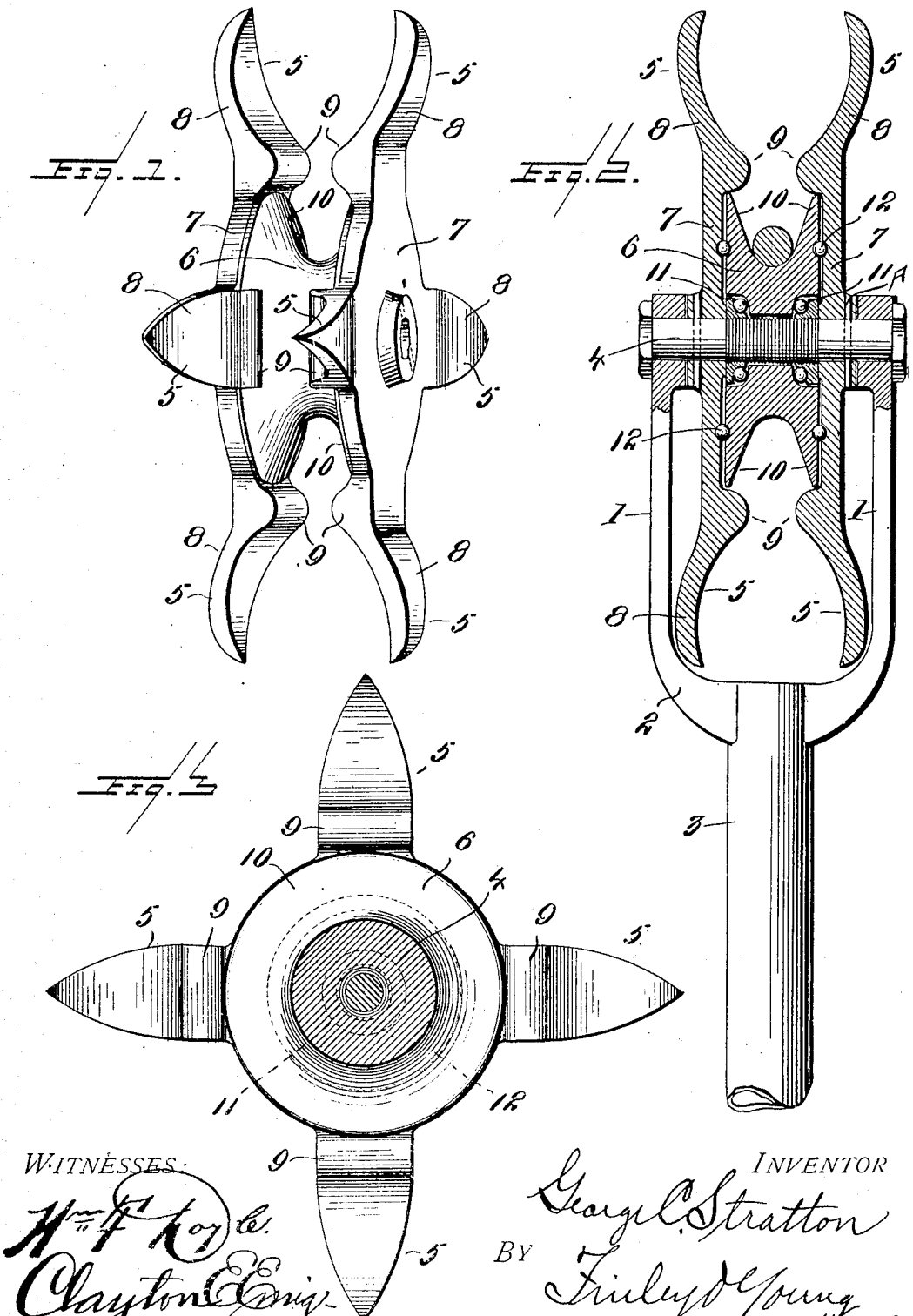

GEORGE C. STRATTON, OF CAMDEN, NEW JERSEY, ASSIGNOR TO RAYMOND L. WARREN AND FLORENCE E. CRAMER, OF CAMDEN, NEW JERSEY.

TROLLEY-WHEEL FOR ELECTRIC CARS.

No. 887,439.   Specification of Letters Patent.   Patented May 12, 1908.

Application filed July 18, 1907. Serial No. 384,354.

*To all whom it may concern:*

Be it known that I, GEORGE C. STRATTON, a citizen of the United States, residing at Camden, in the county of Camden and State of New Jersey, have invented a new and useful Improvement in Trolley-Wheels for Electric Cars, of which the following is a specification.

This invention relates to trolley wheels for electric cars, and has for its object to provide an improved trolley wheel by means of which the trolley wheel will be prevented from jumping or leaving the wire, either in a straight course or on curves, or crossing wires, and also by means of which the wheel and wire may be kept clear of ice and snow.

Referring to the accompanying drawings, Figure 1 is a perspective view of the invention, Fig. 2 is an end view in vertical section, and Fig. 3 is a side view in vertical section.

In the construction of this invention, 1, 1, are the arms of the fork 2, of a trolley-pole 3, the arms 1, 1, carrying a shaft 4, provided with a number of radial arms 5, rigidly secured upon the shaft by the cotter pins A constituting a protector for the trolley wheel, as hereinafter set forth.

6 is the trolley wheel, loosely mounted on the shaft 4, and located between the radial arms 5. The radial arms 5 are arranged in pairs each having the straight member 7 extending the diameter of the trolley wheel 6, and a curved member, 8, at each end, having an inner curved shoulder 9 in front of the edge of each rim 10, of the trolley wheel 6. By means of this construction the inner curved faces of the pairs of members 8 will be opposite each other and the rims 10 of the trolley wheel will revolve inside of the curved shoulders 9.

The trolley wheel and protector are made of suitable conducting metal.

In use the curved members 8 are always up above the wire so that it is impossible for the trolley wheel to get off the wire. In going about curves the wire will be at one side of the trolley wheel and the wheel will be retained in place by the shoulders 9. The protector enables the trolley wheel to pass smoothly over crossing wires. In crossings, and at angles, the protector will revolve so as to strike a cross wire or smooth wire or switch plate and enable the trolley wheel to clear smoothly and still be retained on the wire. If for any reason the wire is brought above the shoulders 9, the curved members 8 will retain the wheel on the wire.

To reduce friction, the shaft 4 may be provided with ball bearings 11, as shown, and ball bearings 12 may be located between the wheel 6 and the arms 5.

By means of this invention the wheel can never get off the wire, constant and perfect contact is assured, and the wheel accommodates itself to all conditions of curves, crossings, etc. The radial arms of the protector serve to remove ice and snow from the wire.

Having thus fully described my invention, what I claim as new and desire to be secured by Letters Patent, is:

1. A combined trolley wheel and protector, consisting of a trolley wheel loosely mounted on a shaft between pairs of radial arms fixed to said shaft, and having curved projecting ends extending beyond the periphery of the wheel, and curved shoulders projecting over the periphery of the wheel, as set forth.

2. A combined trolley wheel and protector, consisting of pairs of radial arms fixed on a shaft, and a trolley wheel loosely mounted on said shaft between the radial arms, the latter having opposite curved shoulders extending inwardly over the periphery of the wheel, and oppositely curved end portions extending from the curved shoulders, as set forth.

In testimony whereof, I have hereunto signed my name in the presence of two subscribing witnesses:

GEORGE C. STRATTON.

Witnesses:
RANDOLPH CRAMER,
WILLIAM C. DIXON.